(12) United States Patent
Mizunoue et al.

(10) Patent No.: US 10,697,459 B2
(45) Date of Patent: Jun. 30, 2020

(54) METHOD FOR MANUFACTURING A FLUID DEVICE IN WHICH FLANGES ARE FASTENED TOGETHER

(71) Applicant: MITSUBISHI HEAVY INDUSTRIES COMPRESSOR CORPORATION, Tokyo (JP)

(72) Inventors: Toshio Mizunoue, Tokyo (JP); Kazutoshi Yokoo, Tokyo (JP); Daisuke Hirata, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 229 days.

(21) Appl. No.: 15/936,935

(22) Filed: Mar. 27, 2018

(65) Prior Publication Data
US 2018/0283385 A1    Oct. 4, 2018

(30) Foreign Application Priority Data
Mar. 29, 2017    (JP) .................. 2017-066352

(51) Int. Cl.
| | |
|---|---|
| *F04D 29/08* | (2006.01) |
| *B23P 6/00* | (2006.01) |
| *F04D 29/40* | (2006.01) |
| *F04D 17/12* | (2006.01) |
| *F04D 29/42* | (2006.01) |
| *F01D 25/24* | (2006.01) |

(52) U.S. Cl.
CPC .............. *F04D 17/125* (2013.01); *B23P 6/00* (2013.01); *F04D 29/083* (2013.01); *F04D 29/4206* (2013.01); *F01D 25/243* (2013.01); *F04D 29/403* (2013.01); *F05B 2230/10* (2013.01); *F05B 2230/80* (2013.01); *F05B 2240/14* (2013.01); *F05B 2240/57* (2013.01); *F05B 2260/301* (2013.01)

(58) Field of Classification Search
CPC ........ F02K 1/80; F04D 17/122; F04D 17/125; F04D 29/4206; F04D 29/083; F04D 29/403; F04D 29/624; B23P 6/00; F01D 25/243; F05B 2230/10; F05B 2230/80; F05B 2240/57; F05B 2240/14; F05B 2260/301
See application file for complete search history.

(56) References Cited

U.S. PATENT DOCUMENTS 5,230,540 A * 7/1993 Lewis ................... F02K 1/80
                                                              285/363

FOREIGN PATENT DOCUMENTS

JP        S52-119704 A    10/1977

* cited by examiner

*Primary Examiner* — Lee A Holly
(74) *Attorney, Agent, or Firm* — Osha Liang LLP

(57) ABSTRACT

A method of manufacturing a fluid apparatus with flanges that are fastened together may include the following steps: fastening the flanges with a fastening member; introducing a fluid into an internal space of the fluid apparatus, and plastically deforming portions of the flanges that form seats for receiving the fastening member and portions of the flanges that form mating surfaces with pressure of the fluid being applied; releasing the fastening member and correcting at least the mating surfaces out of the seats and the mating surfaces; and refastening the flanges.

6 Claims, 7 Drawing Sheets

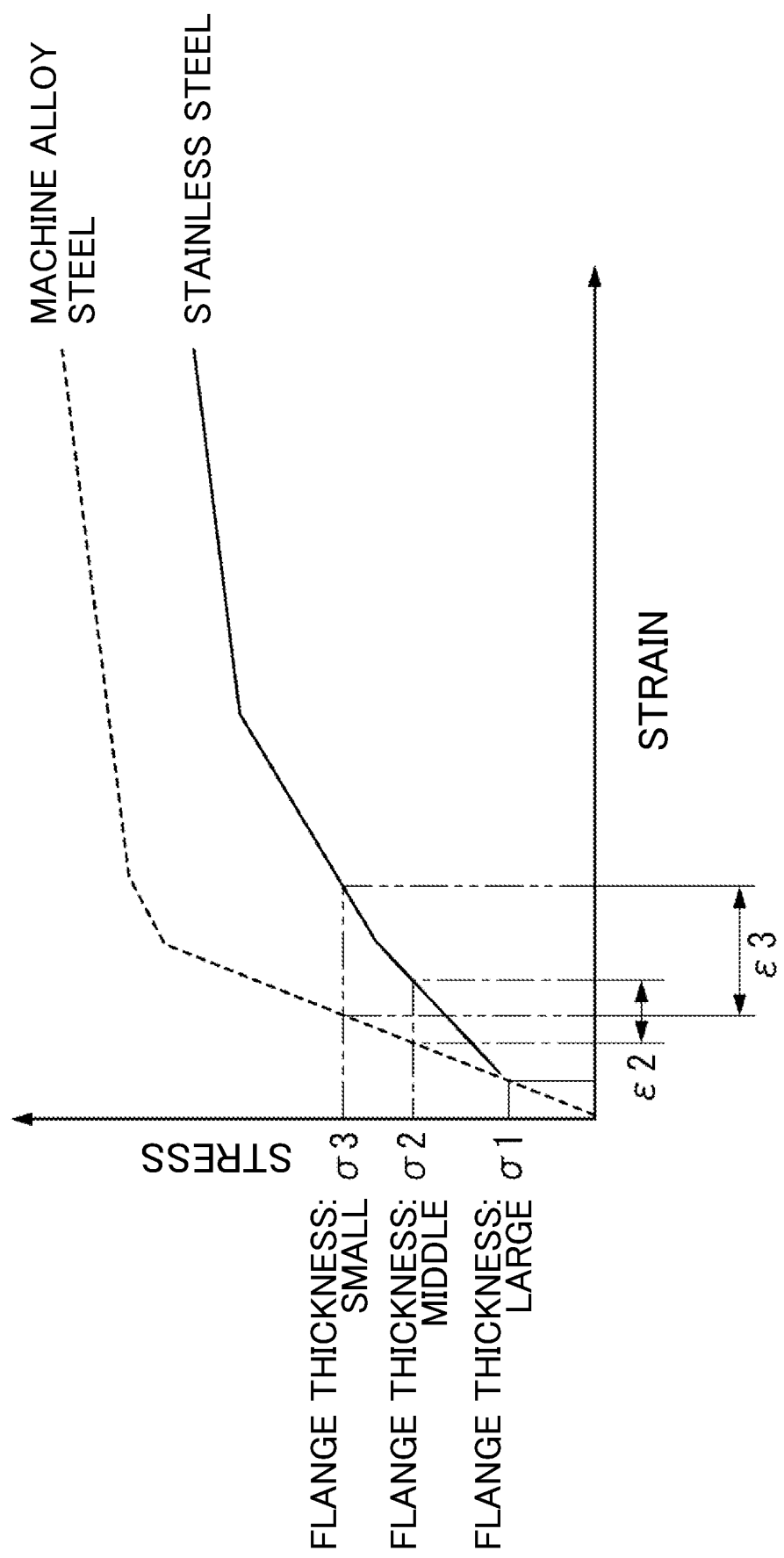

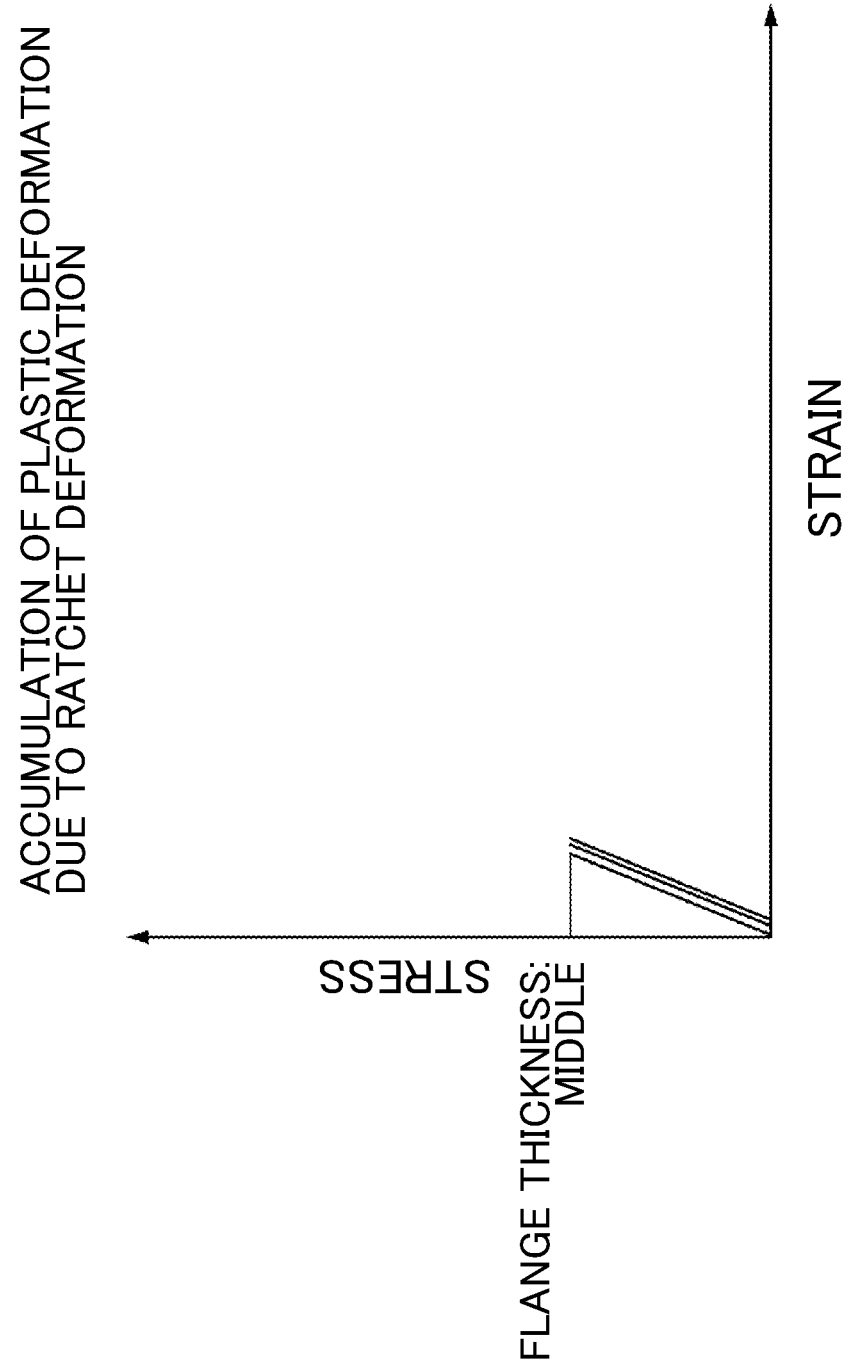

METHOD FOR MANUFACTURING A FLUID DEVICE IN WHICH FLANGES ARE FASTENED TOGETHER

TECHNICAL FIELD

The present invention relates to a technology of preventing a leak of a fluid from between flanges in a fluid apparatus including the flanges that are fastened together.

BACKGROUND

A compressor includes a rotor coupled to a rotating shaft, a bearing that supports the rotating shaft, and a shell that houses the rotor. Upon the rotation of the rotor, the compressor sucks a gas from an inlet into the shell to compress the gas and discharge the gas from an outlet.

The shell of the compressor is typically divided in a horizontal direction, and a flange of an upper half-split body and a flange of a lower half-split body are fastened by bolts (Patent Literature 1).

In Patent Literature 1, a groove and a protrusion formed in mating surfaces of the flanges are engaged to prevent a high pressure gas in the shell from leaking outside from between the flanges.

CITATION LIST

Patent Literature

[Patent Literature 1] JP 973814 B2 (JP 52-119704 A)

Since a high pressure and high temperature gas exists in the shell, application of gas pressure or heat deformation caused by a temperature difference between the high temperature gas and the bearing may cause a leak of the gas from the mating surfaces of the flanges.

Even if the groove and the protrusion are formed in the mating surfaces of the flanges to prevent a leak as in Patent Literature 1, a leak may occur depending on gas pressure or if the flanges are deformed by a temperature gradient.

A material having sufficient resistance to gas pressure or heat deformation cannot be always used for the shell. For example, if a material having corrosion resistance to a gas introduced into the shell is chosen, the flanges may be plastically deformed beyond yield strength of the material. Plastic deformation of the flanges may reduce an axial force of a bolt and reduce surface pressure of the mating surfaces of the flanges, thereby causing the gas to leak from between the flanges.

Using a through bolt extending through both the flanges butted together to prevent a leak can increase a clamping force (axial force) of the bolt. However, a shell structure around the flanges needs to be altered to change a typical stud bolt into the through bolt. Also, since the bolt and seats of the flanges need to be kept under yield stress in consideration of a clamping force increased by an action of internal pressure or heat deformation in operation, there is a limit to increase the clamping force applied to the bolt.

It is difficult to accurately understand, in advance, surface pressure required for the mating surfaces of the flanges for preventing a leak. Thus, a test operation on a leak is performed before shipment. If a leak occurs in the test operation, it is difficult to apply a clamping force to a bolt such that no yield occurs on the bolt and seats.

SUMMARY

Based on the above, one or more embodiments of the present invention provide a novel approach effective for preventing a fluid from leaking from between flanges.

One or more embodiments of the present invention provide a method of manufacturing a fluid apparatus with flanges that are fastened together, the method including: a fastening step of fastening the flanges with a fastening member; a work-hardening step of introducing a fluid into an internal space of the fluid apparatus, and plastically deforming portions that form seats of the flanges configured to receive the fastening member and portions that form mating surfaces of the flanges with pressure of the fluid being applied; a correction step of releasing the fastening of the flanges and correcting at least the mating surfaces out of the seats and the mating surfaces; and a refastening step of fastening the flanges.

In the method of manufacturing a fluid apparatus according to one or more embodiments of the present invention, the flanges may be fastened by the fastening member having higher yield strength than the flanges in the work-hardening step.

In the method of manufacturing a fluid apparatus according to one or more embodiments of the present invention, a periphery of a portion depressed by yield and a convex portion protruded by yield may be removed in at least the mating surfaces out of the seats and the mating surfaces in the correction step.

In the method of manufacturing a fluid apparatus according to one or more embodiments of the present invention, the work-hardening step may be repeated a plurality of times.

In the method of manufacturing a fluid apparatus according to one or more embodiments of the present invention, the fluid apparatus may be a compressor configured to compress the fluid, a casing that houses the compression mechanism configured to compress the fluid includes half-split bodies, and the flanges included in the half-split bodies are fastened together.

In the method of manufacturing a fluid apparatus according to one or more embodiments of the present invention, a discharge volute through which the compressed fluid passes toward an outlet of the compressor may be formed to expand inward in an axial direction of the casing.

By the work-hardening step of plastically deforming the fastened flanges, yield strength of a material used for the flanges is increased based on the work-hardening. Thus, by the correction step, an irregular surface caused by yield of the flanges can be corrected to a state before plastic deformation, and when fluid pressure is again applied with the flanges being fastened, strain of the flanges can be maintained within an elastic region. Specifically, even if stress caused by fluid pressure, heat deformation, or the like is applied to the flanges, plastic deformation of the flanges can be avoided, thereby maintaining an axial force of the fastening member. Thus, without increasing a clamping force, surface pressure required for preventing a leak can be ensured on the mating surfaces of the flanges to reliably seal between the flanges.

According to one or more embodiments of the present invention, a work-hardening step, the correction step, and the refastening step can be performed as an adjustment work including a test of the fluid apparatus before shipment, thereby increasing strength of the flanges afterward without changing an apparatus structure around the flanges.

Thus, even if a material having low material strength is used for a member including the flanges, plastic deformation caused by stress applied to the flanges in operation can be avoided by the work-hardening and the correction. According to one or more embodiments of the present invention, flexibility of choice of a material for the member including the flanges can be improved.

BRIEF DESCRIPTION OF DRAWINGS

FIG. 4 is a schematic view of a stress-strain curve for each material.

FIG. 7 is a schematic view of accumulation of plastic deformation due to ratchet deformation.

DETAILED DESCRIPTION

Figure 1:
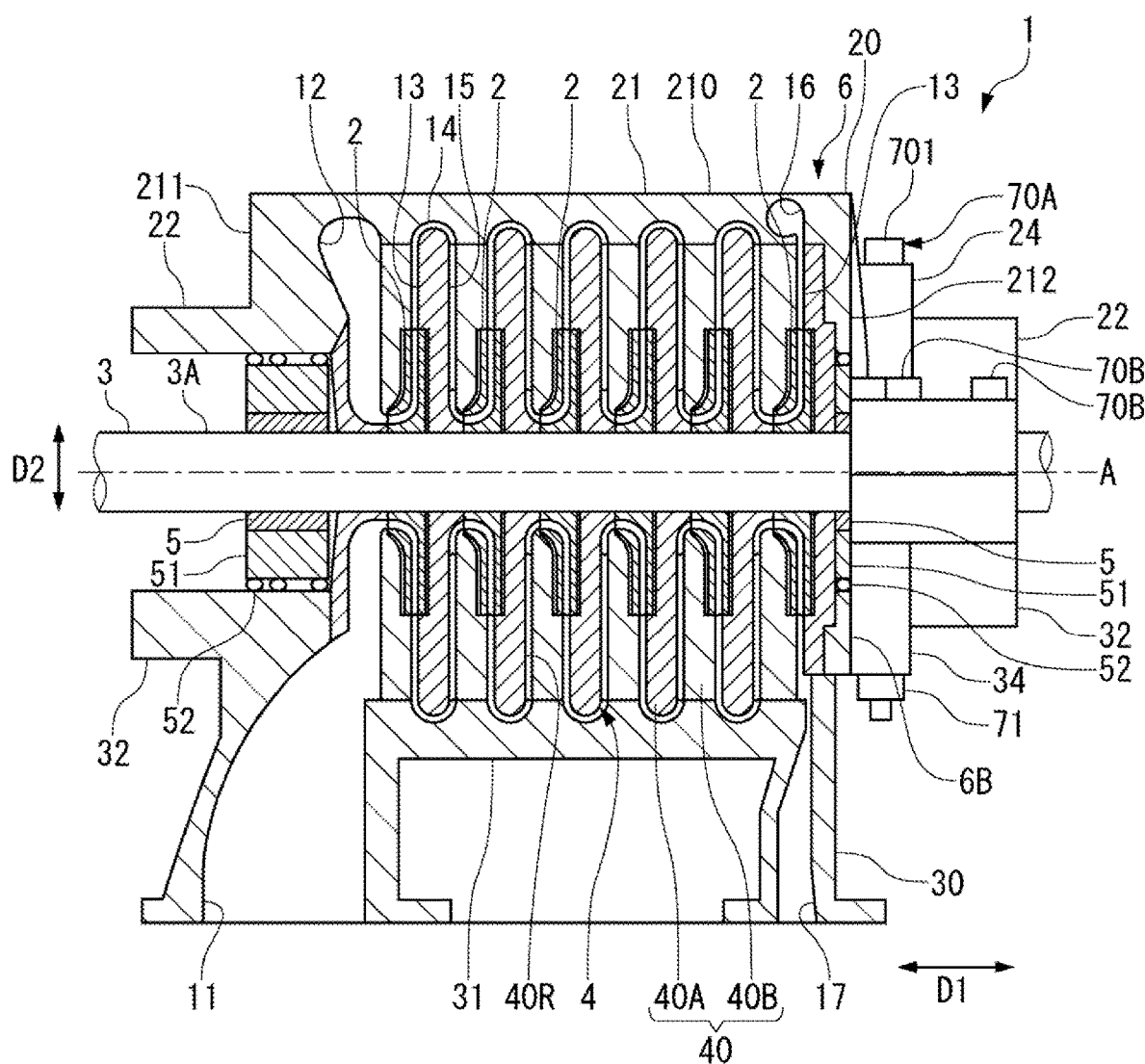
FIG. 1 is a vertical sectional view of a centrifugal compressor according to one or more embodiments of the present invention taken along the line I-I in FIG. 2.

Now, with reference to the accompanying drawings, a fluid apparatus with flanges that are fastened together and a method of manufacturing the fluid apparatus according to one or more embodiments of the present invention will be described below. In these one or more embodiments, a centrifugal compressor will be described as an example of the fluid apparatus.

[Configuration of Centrifugal Compressor]

First, with reference to FIGS. 1 and 2, a configuration of a centrifugal compressor 1 of one or more embodiments of the present invention will be described.

The centrifugal compressor 1 (hereinafter referred to as a compressor 1) includes a plurality of impellers 2 and is configured in a multistage manner. The compressor 1 is incorporated into plant equipment or the like, and compresses an introduced process gas and discharges the gas.

The compressor 1 includes a rotor 3 including the plurality of impellers 2, a group of diaphragms 4, a seal device 5, and a shell 6 including an upper half shell 20 and a lower half shell 30.

The rotor 3 includes a rotating shaft 3A extending along a horizontal direction, and the plurality of impellers 2 coupled to an outer peripheral portion of the rotating shaft 3A. An axis of the rotating shaft 3A is denoted by A, and a direction along the axis A is referred to as an axial direction D1. Opposite ends of the rotating shaft 3A are supported by bearings (not shown) outside the shell 6.

The rotating shaft 3A is rotated by a drive source such as a motor connected to the rotating shaft 3A to rotationally drive the plurality of impellers 2. Then, the impellers 2 compress the process gas (working fluid) with a centrifugal force.

The group of diaphragms 4 include a plurality of diaphragms 40 arranged along the axial direction D1 corresponding to the impellers 2 on the plurality of stages, respectively. The diaphragm 40 includes members 40A and 40B connected via a return vane 40R.

The group of diaphragms 4 covers the impellers 2 from an outer peripheral side.

The diaphragm 40 and an inner wall of the shell 6 define a flow path communicating with a flow path of the impeller 2 and through which the process gas passes.

The process gas sucked from an inlet 11 into the shell 6 by rotation of the rotor 3 flows through a suction flow path 12 into the impeller 2 on the first stage, flows outward in a radial direction from an outlet of the flow path of the impeller 2 by a diffuser flow path 13, and further flows through a curved flow path 14 and a return flow path 15 into an inlet of a flow path located on an inner peripheral side of the impeller 2 on the next stage. Then, the process gas repeatedly flows through the flow path of the impeller 2, the diffuser flow path 13, the curved flow path 14, and the return flow path 15 into the impeller 2 on the next stage, flows from the impeller 2 on the last stage through the diffuser flow path 13 and a discharge volute 16, and is discharged through an outlet 17 out of the shell 6.

The discharge volute 16 is formed into an annular shape over an entire circumferential direction of the shell 6. The discharge volute 16 is formed to expand inward (upstream) in the axial direction D1 with respect to a position of an extension of the diffuser flow path 13 through which the high pressure gas flowing out of the impeller 2 on the last stage flows.

In this embodiment, an expanding direction of the discharge volute 16 is set to be inward in the axial direction D1, thereby preventing a rear end of the shell 6 from expanding downstream in the axial direction D1.

A rear end of the upper half shell 20 of the shell 6 has a base 24 taller than a flange 61, and a rear end of the lower half shell 30 has a base 34 taller than a flange 62.

A seal device 5 seals the space between an outer peripheral portion of the rotating shaft 3A and the shell 6 over the entire circumference to prevent the process gas from leaking out of the shell 6. The seal device 5 may be a labyrinth seal.

The seal device 5 is arranged on each end side of the rotating shaft 3A, and held by a seal housing holder 51. A seal member 52 seals the space between an outer peripheral portion of the seal housing holder 51 and the shell 6.

The shell 6 is formed into a substantially cylindrical shape, houses the rotor 3 and the group of diaphragms 4 therein, and surrounds the outer peripheral portion of the seal housing holder 51.

The shell 6 may be made of a metal material having corrosion resistance to the process gas in contact. The shell 6 in one or more embodiments of the present invention is made of stainless steel.

The shell 6 includes the upper half shell 20 (FIGS. 1 and 2) and the lower half shell 30 (FIG. 1) divided along a horizontal surface including the axis A. The upper half shell 20 and the lower half shell 30 are integrated by the flanges 61, 62 thereof being fastened together.

Figure 2:
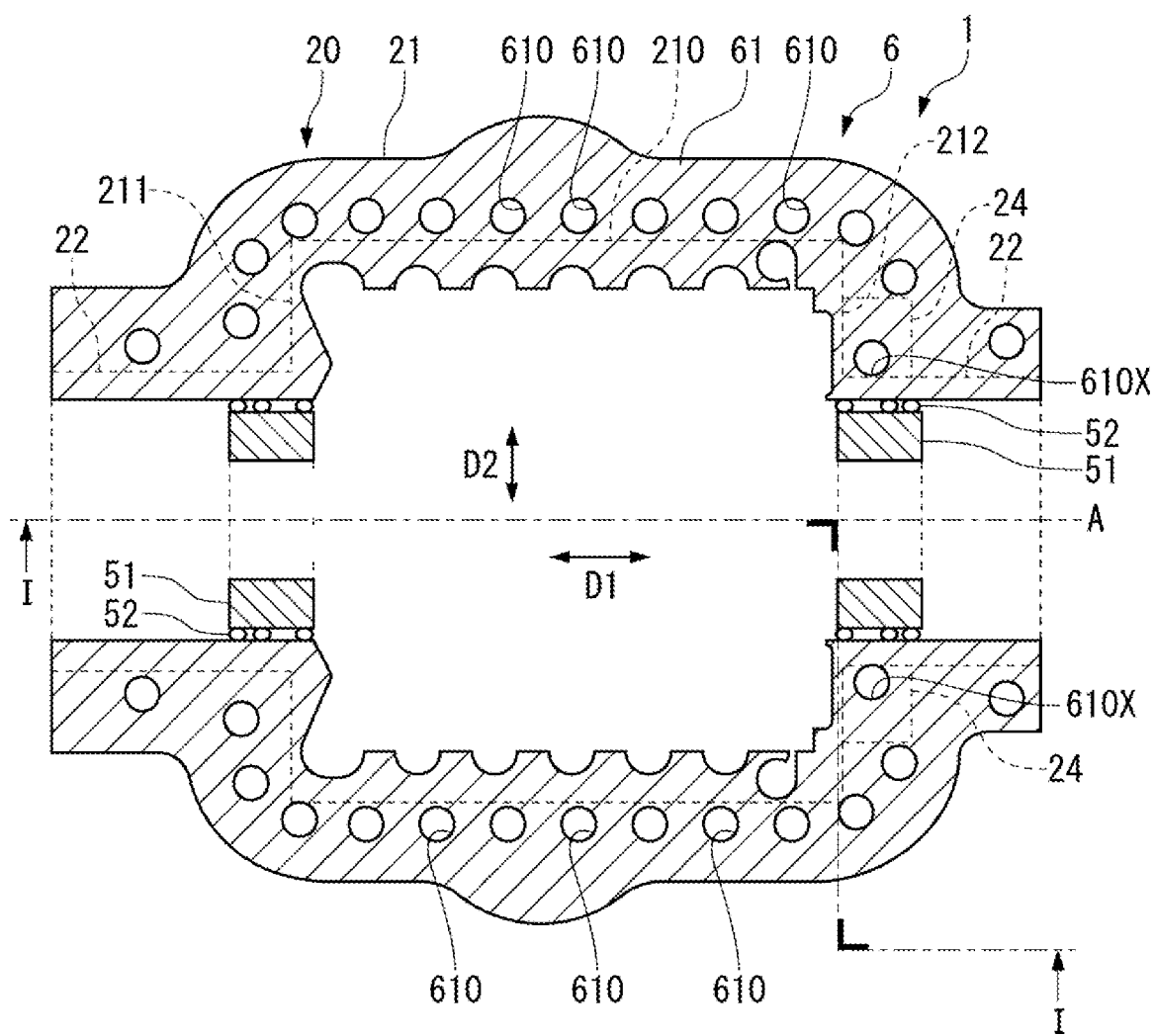
FIG. 2 is a cutaway view of an upper half shell of the compressor shown in FIG. 1 taken near a rotating shaft.

As shown in FIGS. 1 and 2, the upper half shell 20 includes a housing portion 21 that houses the rotor 3 and the group of diaphragms 4, a surrounding portion 22 that surrounds the seal housing holder 51, and the flange 61 protruding outward in the horizontal direction from lower ends of the housing portion 21 and the surrounding portion 22.

The housing portion 21 includes a semi-cylindrical peripheral wall 210, a front side wall 211 closing a front end of the peripheral wall 210, and a rear side wall 212 closing a rear end of the peripheral wall 210.

The surrounding portion 22 is formed into a semi-cylindrical shape having a smaller diameter than the housing portion 21, and arranged on each of a front side (upstream side) and a rear side (downstream side) of the housing portion 21.

The flange 61 is arranged over the entire lower ends of the housing portion 21 and the surrounding portion 22. The flange 61 has multiple insertion holes 610 (FIG. 2) through which bolts are inserted respectively. The insertion holes 610 are distributed and arranged over the entire circumference of the flange 61. Into each of the insertion holes 610, a bolt 70 (FIG. 1) used for fastening the upper half shell 20 and the lower half shell 30 is inserted.

In order to resist pressure of the gas compressed on the last stage, a through bolt 70A (FIG. 1) may be used in an insertion hole 610X (FIG. 2) located innermost (most upstream) in the axial direction D1 and located closest to the rotating shaft 3A in a radial direction D2 of the shell 6 among the insertion holes 610 near a rear end 6B of the shell 6 where the outlet 17 is located. The through bolt 70A achieves enhancement of a clamping force and stress dispersion to a wider range around a shank as compared to a stud bolt 70B (FIG. 1).

In the other insertion holes 610, either the stud bolt 70B or the through bolt 70A may be used.

The lower half shell 30 (FIG. 1), like the upper half shell 20, includes a housing portion 31, a surrounding portion 32 that surrounds the seal housing holder 51, and a flange 62 protruding outward in the horizontal direction from lower ends of the housing portion 31 and the surrounding portion 32.

The flange 62 of the lower half shell 30 has a through hole into which the bolt is inserted or an internal thread into which the bolt is screwed. The through hole and the internal thread are not shown.

An upper surface of the flange 62 of the lower half shell 30 and a lower surface of the flange 61 of the upper half shell 20 are butted together. The upper surface of the flange 62 and the lower surface of the flange 61 are hereinafter referred to as mating surfaces 612 (FIG. 3) of the flange 61 and the flange 62. The mating surface 612 of the flange 61 is formed to be flat along the horizontal direction.

The through bolt 70A described above has a head 701 and a shank (not shown). With the lower surface of the flange 61 and the upper surface of the flange 62 being butted together, the shank of the through bolt 70A is inserted through the insertion hole 610 in the flange 61 of the upper half shell 20 and a through hole (not shown) in the flange 62 of the lower half shell 30. The shank of the through bolt 70A protruding downward of the flange 62 is screwed into a nut 71.

The stud bolt 70B described above has threads on opposite end sides. The stud bolt 70B is inserted into the insertion hole 610 in the flange 61, and into the internal thread in the flange 62 of the lower half shell 30. An upper end of the stud bolt 70B is screwed into a nut 72 that serves as a head of the bolt.

The through bolt 70A, the stud bolt 70B, and the nuts 71, 72 have yield strength higher than yield strength of the flanges 61, 62.

Figure 3A:
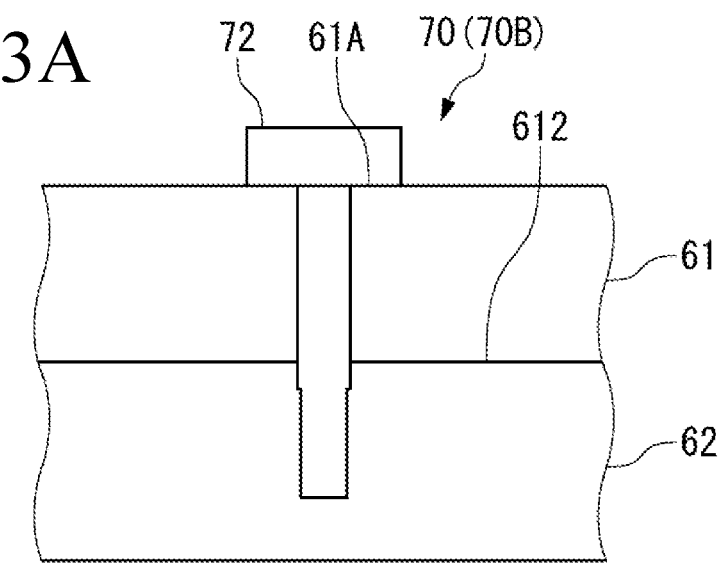
FIG. 3A is a schematic view of a state in which a flange of the upper half shell and a flange of a lower half shell are fastened by a bolt.

FIG. 3A shows a state in which the flange 61 and the flange 62 are fastened by the bolt 70. The stud bolt 70B is shown as an example of the bolt 70. An axial force of the bolt 70 is sufficiently applied to reliably fasten the flange 61 and the flange 62 with a sufficient clamping force.

Now, in operation of the compressor 1, the pressure of the gas in the shell 6 creates an opening (a gap) in the mating surface 612 of the flange 61, and there is a need to prevent the gas from leaking through the opening out of the shell 6. There is also a need to prevent the inside gas from leaking from the mating surfaces 612 due to heat deformation of the flanges 61, 62 caused by a temperature difference made between the upstream side and the downstream side in the shell 6 with increasing temperature caused by compression of the gas, or particularly a temperature difference between the high pressure gas near the rear end in the shell 6 and a bearing (not shown) located close to the rear end of the shell 6.

However, if the material having corrosion resistance to the gas to be used is chosen or availability of the material is given priority like the shell 6 in this embodiment, excessive stress beyond an elastic region may be applied in operation to plastically deform the flanges 61, 62.

FIG. 4 shows stress-strain curves of stainless steel used for the shell 6 in this embodiment, and machine alloy steel having higher yield strength than the stainless steel in this embodiment. Here, an elastic modulus of the stainless steel is equal to an elastic modulus of the machine alloy steel.

FIG. 4 shows operating stress σ1 when a thickness of the flanges 61, 62 is relatively large, operating stress σ2 when a thickness level is middle, and operating stress σ3 when the thickness is small as stresses that occur in the flanges 61, 62 in operation of the compressor 1.

As shown by a dashed line in FIG. 4, when the shell 6 is made of machine alloy steel, the stresses that occur in the flanges 61, 62 in operation are within the elastic region in all the cases of the large, middle, and small flange thicknesses.

However, as shown by a solid line in FIG. 4, when the shell 6 is made of stainless steel, the stress σ1 that occurs in the flanges 61, 62 in operation is within the elastic region in the case of the large flange thickness, while the stresses σ2, σ3 that occur in the flanges 61, 62 in operation exceed the elastic region and thus the flanges 61, 62 are yielded and plastically deformed in the case of the middle or small flange thickness.

An adjustment work including the operation is performed after assembly of the compressor 1, and the flanges 61, 62 are set to have a thickness that allows strain of the flanges 61, 62 to be within the elastic region over a stress range in operation of the compressor 1. In this embodiment, as described later with reference to FIG. 6, a relatively middle flange thickness may be chosen.

Figure 3B:
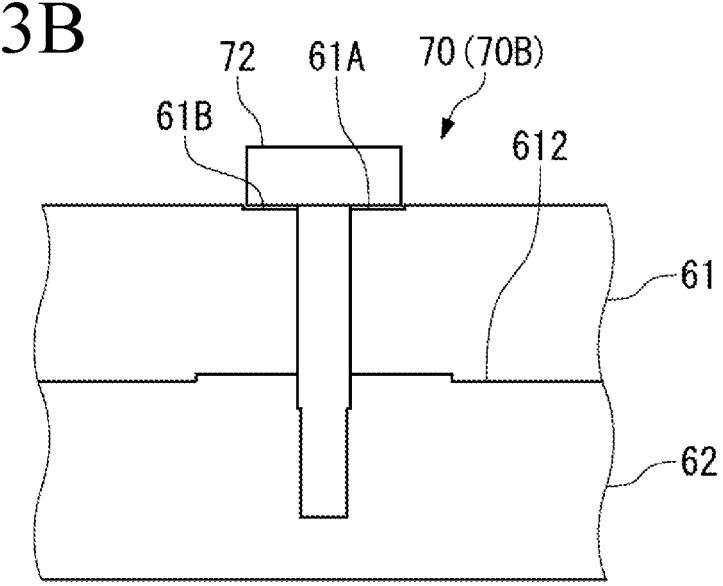
FIG. 3B is a schematic view for illustrating a risk of plastic deformation of the flanges.
Figure 3C:
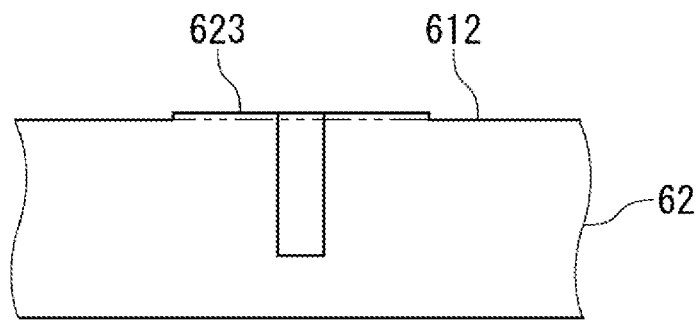
FIG. 3C shows an example of correction.

With reference to FIG. 3B, a risk of plastic deformation of the flanges 61, 62 will be described.

In the example shown in FIG. 3B, the nut 72 is pressed against a seat 61A of the flange 61 with an excessive force by the pressure of the high pressure gas or the heat deformation of the flanges 61, 62, and thus the flange 61 is plastically deformed so that the seat 61A is depressed beyond yield strength of the flange 61. A recess 61B formed in the flange 61 by depression has a depth on the order of, for example, several tens of micrometers.

A washer arranged between the nut 72 and the seat 61A is not shown. Actually, a recess having a size equal to that of the washer is formed in the flange 61.

As described above, the bolt 70 and the nut 72 have yield strength higher than that of the flanges 61, 62, and are not yielded over the range of the stress applied in operation.

The seat 61A receives the nut 72 of the stud bolt 70B or the head 701 of the through bolt 70A via the washer, and is set in a region around the shank of the bolt 70 in the flange 61.

For the through bolt 70A, a seat configured to receive the nut 72 via a washer is also set in a region around the shank in the flange 62.

Also near the mating surfaces 612 in addition to the seat 61A, the pressure of the high pressure gas and the heat deformation of the flanges 61, 62 cause an excessive clamping force, thereby causing plastic deformation of the flanges 61, 62 beyond yield strength thereof. Stress is dispersed in a wider range around the shank of the bolt 70 in the mating surfaces 612 than in the seat 61A. In the example shown in FIG. 3B, since the stud bolt 70B pulls up the flange 62, the upper flange 61 is depressed. An aspect of the plastic deformation of the flanges 61, 62 changes depending on types of the bolt 70, and FIG. 3B merely shows an example.

As shown in FIG. 3B, if both or either of the flanges 61, 62 is plastically deformed, the axial force (clamping force) of the bolt 70 is reduced. Then, surface pressure required for the mating surfaces 612 to prevent a leak is insufficient. This corresponds to the risk due to the plastic deformation of the flanges 61, 62.

Since it is difficult to previously set the surface pressure required for the mating surfaces 612 of the flanges 61, 62, a test operation of the compressor 1 may be performed before shipment to prove that no leak occurs from the mating surfaces 612. If a leak occurs, an adjustment work for increasing the clamping force may be performed.

However, in the adjustment work performed while stopping the operation of the compressor 1 after occurrence of the leak, it is difficult to increase the clamping force so as not to exceed yield strength on the seat 61A and the mating surfaces 612 in consideration of deformation of the flanges 61, 62 within the elastic region in operation.

Thus, one or more embodiments of the present invention provides a method of manufacturing the compressor 1 effective for preventing a leak from between the flanges 61, 62 by adopting a manufacturing process positively using the plastic deformation of the flanges 61, 62 rather than taking the plastic deformation as a risk.

[Method of Manufacturing Compressor]

Figure 5:
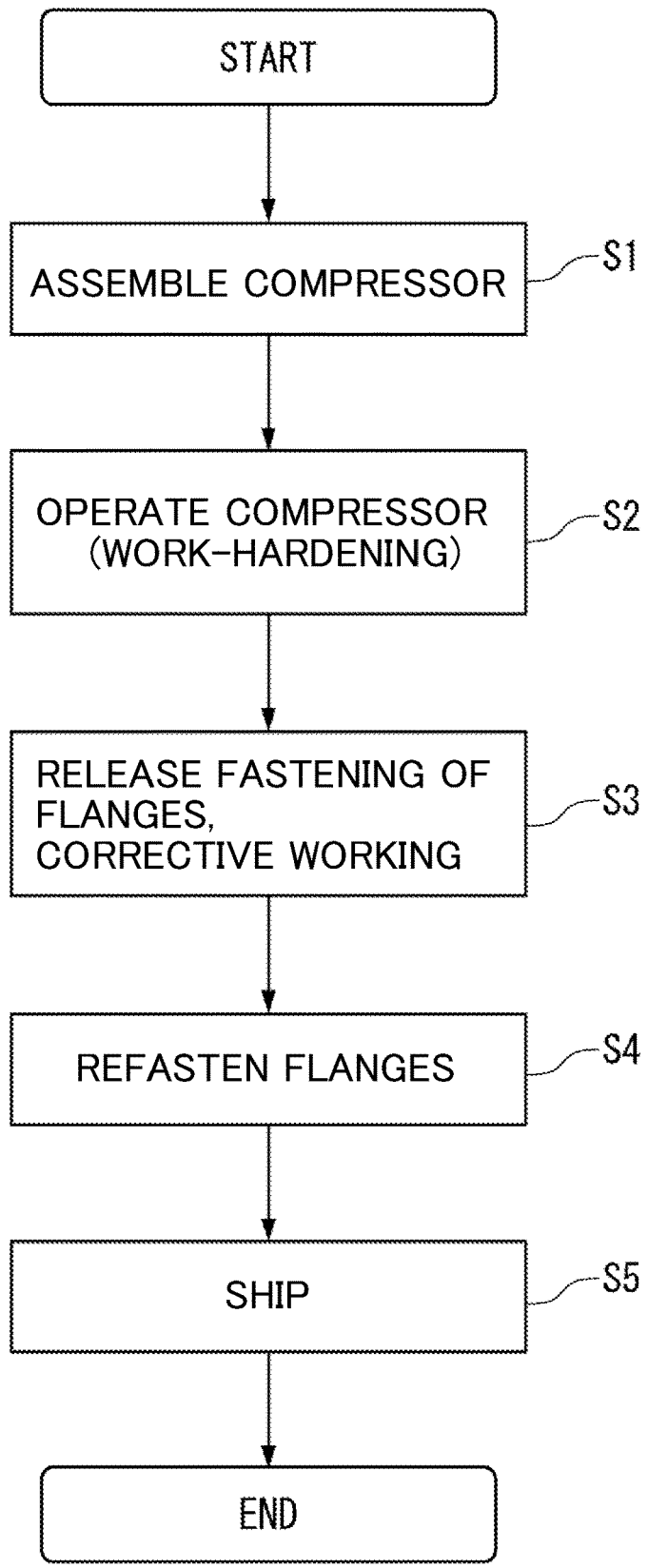
FIG. 5 shows a procedure for manufacturing the compressor of one or more embodiments.

With reference to FIG. 5, a procedure for manufacturing the compressor 1 will be described.

First, the compressor 1 is assembled as appropriate (assembling step S1).

The assembling step S1 includes a fastening step of fastening the flange 61 of the upper half shell 20 and the flange 62 of the lower half shell 30 with the plurality of bolts 70.

In the assembling step S1, the rotor 3 and the group of diaphragms 4 are assembled, the seal device 5 and the seal housing holder 51 are assembled to the rotating shaft 3A, the assemblies are housed between the lower half shell 30 and the upper half shell 20, and then the flanges 61, 62 are butted together and fastened by the plurality of bolts 70. Thus, the upper half shell 20 and the lower half shell 30 are integrated to form the shell 6.

When the flanges 61, 62 are fastened, an operation step S2 (work-hardening step) is performed to dare to plastically deform the flanges 61, 62.

In the operation step S2, the process gas is introduced into the shell 6 to operate the compressor 1 for a predetermined time. Since the pressure of the compressed process gas is applied to the flanges 61, 62 during operation, an axial force (clamping force) larger than an axial force of the bolt 70 before operation is applied to the flanges 61, 62. The gas pressure and a sharp temperature gradient in the flanges 61, 62 and therearound cause excessive stress in the flanges 61, 62 with respect to the stress range corresponding to the elastic region of the material (stainless steel) of the shell 6. If the stress applied to the flanges 61, 62 exceeds yield strength, the flanges 61, 62 that form the seat 61A and the mating surfaces 612 are plastically deformed (for example, FIG. 3B).

As shown in FIG. 4, when the flange thickness level is middle, the plastic deformation causes plastic strain $\varepsilon 2$, and when the flange thickness is small, the plastic deformation causes plastic strain $\varepsilon 3$. The plastically deformed portion has increased hardness (work-hardening).

Figure 6A:
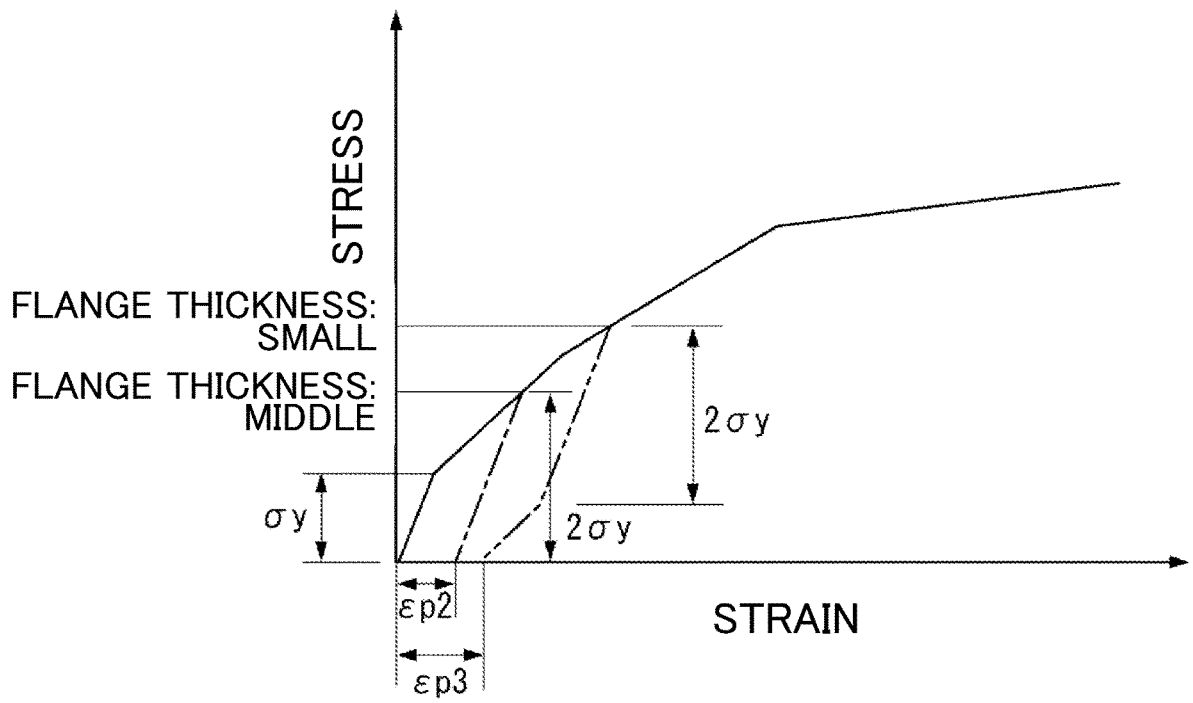
FIG. 6A is a schematic view of plastic strain remaining after operation.

If the operation of the compressor 1 is stopped after the operation step S2, the stress caused by the gas pressure or the heat deformation is released, and as shown in FIG. 6A, the plastic strain remains in the plastically deformed portion such as the seat 61A or the mating surfaces 612. The plastic strain remaining when the flange thickness level is middle is denoted by $\varepsilon p2$, and the plastic strain remaining when the flange thickness level is low is denoted by $\varepsilon p3$.

The residual stress when the flange thickness is middle and small is $2\sigma y$ that is about twice yield strength $\sigma y$ of stainless steel used in this embodiment.

After the operation step S2 is finished, for example as shown in FIG. 3B, portions near the seat 61A of the flange 61 and near the mating surfaces 612 of the flanges 61, 62 are plastically deformed. The plastic deformation reduces the axial force of the bolt 70, which may cause a leak from the mating surfaces 612.

Then, to ensure a sealing property of the gas by the flanges 61, 62, a corrective working step S3 (FIG. 5) of correcting at least one of the plastically deformed flanges 61, 62 is performed.

In the correction step S3, the bolt 70 is removed from the flanges 61, 62 to release the fastening, and at least the mating surfaces 612 out of the seat 61A and the mating surfaces 612 are cut and ground to be flat in conformity to the shape before plastic deformation. The seat 61A of the flange 61 may be machined to be flat to improve appearance and so on.

In an area fastened by the through bolt 70A, the seat of the flange 61 configured to receive the head 701 of the through bolt 70A (FIG. 1) and the seat of the flange 62 configured to receive the nut 71 screwed into a tip side of the shank of the through bolt 70A are plastically deformed to be depressed. These seats may be machined to be flat like those before plastic deformation.

In the corrective working step S3, a periphery of a portion depressed by yield and a convex portion protruded by yield may be removed to form the mating surfaces 612 of the flanges 61, 62 to be flat. In an example in FIG. 3C, a convex portion 623 of the flange 62 is removed by grinding or the like along a two-dot chain line to form an upper surface of the flange 62 to be flat.

In consideration that the flanges 61, 62 are removed for corrective working, the flanges 61, 62 may be previously formed to have a slightly larger thickness than a thickness required for ensuring rigidity and strength if required. Specifically, an excess thickness is previously provided to either or both of the flanges 61, 62. For example, the thickness of the flanges 61, 62 may be increased by about 1% of the thickness required for ensuring rigidity and thickness.

After the corrective working step S3 is finished, a refastening step S4 (FIG. 5) of again fastening the flange 61 of the upper half shell 20 and the flange 62 of the lower half shell 30 with the bolt 70 is performed. At this time, a clamping torque equal to that in the fastening (step S1) before the work-hardening may be applied to the bolt 70.

Even if the flanges 61, 62 are yielded in the operation step S2, the bolt 70 is not yielded, and thus the bolt 70 drawn out of the flanges 61, 62 in the corrective working step S3 can be returned as it is into the flanges 61, 62. Of course, the bolt 70 may be replaced with a new bolt 70 in the refastening step S4.

Figure 6B:
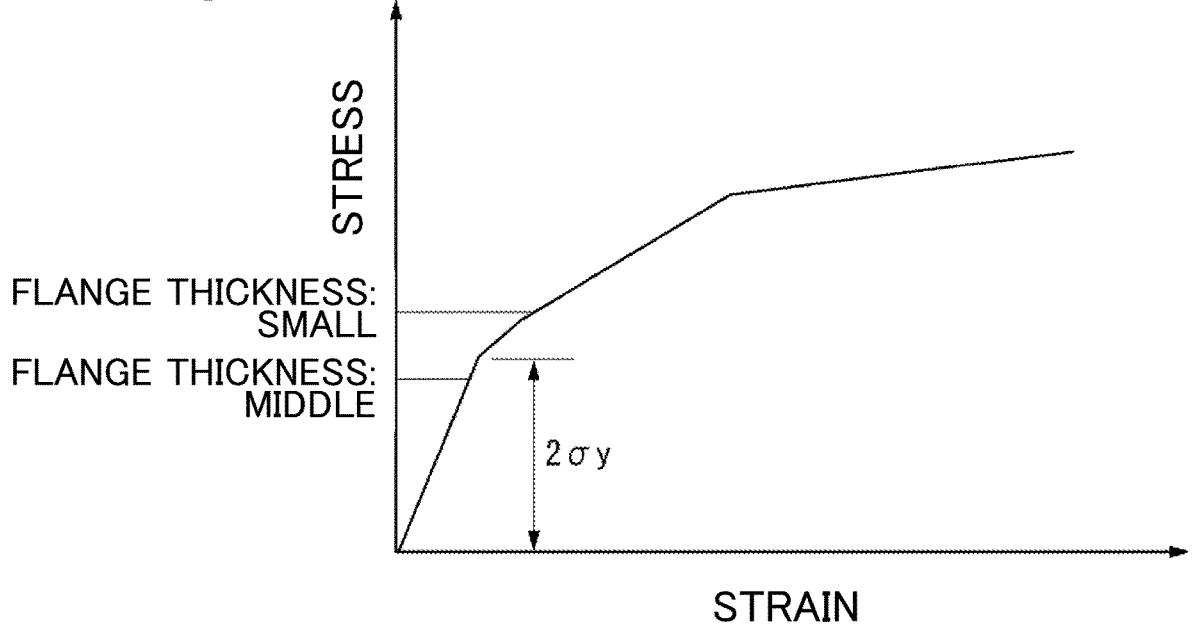
FIG. 6B is a schematic view of stress that occurs in the flanges in reoperation following the correction after operation.

When the compressor 1 after finishing the refastening step S4 is operated again, a stress-strain curve as shown in FIG. 6B is obtained for the material of the shell 6. The yield strength of the material used for the flanges 61, 62 is increased to the yield strength corresponding to the residual stress 2σy shown in FIG. 6A. Specifically, by the operation step S2 and the corrective working step S3 described above, the yield strength is increased based on the work-hardening.

Here, when the flange thickness is middle, the strain of the flanges 61, 62 can be maintained within the elastic region over the stress range in operation of the compressor 1. Specifically, without ensuring a large thickness of the flanges 61, 62, plastic deformation of the flanges 61, 62 due to the stress applied in operation can be avoided, and thus the axial force of the bolt 70 can be maintained. Thus, without increasing the clamping force, surface pressure required for preventing a leak can be stably ensured on the mating surfaces 612.

Through steps S1 to S4 described above, the manufacture of the compressor 1 is completed.

The compressor 1 shipped thereafter (step S5) can maintain the axial force of the bolt 70 without plastic deformation of the flanges 61, 62 in operation. This can stably provide an effect of preventing a leak from the mating surfaces 612 while applying predetermined surface pressure on the mating surfaces 612.

Even if a leak occurs and the clamping force needs to be increased, increased yield strength allows the bolt 70 to be further fastened within the elastic region of the flanges 61, 62.

After the refastening step S4, the compressor 1 may be operated before shipment to check if no leak occurs or if a leak is sufficiently reduced.

By the manufacturing method according to this embodiment, the gas pressure or the sharp temperature difference in operation can deform the flanges 61, 62 to a plastic region in the adjustment work (steps S2 to S4) including a required test operation before shipment, thereby increasing yield strength based on the work-hardening. Thus, although a material having high availability but low material strength is used for the shell 6 that uses a large amount of the material, plastic deformation caused by the stress applied to the flanges 61, 62 can be avoided in operation after shipment. This allows stable operation while ensuring required surface pressure on the mating surfaces 612 and preventing a leak. One or more embodiments of the present invention can improve flexibility of choice of the material of the shell 6.

By the approach according to this embodiment, the manufacturing process of operating the compressor 1 to cause plastic deformation afterward can increase yield strength of the flanges 61, 62 without changing the design for the shape or the like of the shell 6. Thus, this approach can be applied to an existing compressor.

Specifically, not limited to the case of newly manufacturing the compressor 1, in order to increase a sealing property between the flanges 61, 62 of the existing compressor 1, the existing compressor 1 may be operated so that excessive stress is applied to the fastened flanges 61, 62 and the flanges 61, 62 are plastically deformed (work-hardening step), at least mating surfaces 612 of the plastically deformed flanges 61, 62 may be machined to be flat (corrective working step), and then the flanges 61, 62 may be again fastened by a bolt 70. The "manufacture" in one or more embodiments of the present invention encompasses such a repair of an existing compressor.

Now, a configuration for preventing a leak included in the shell 6 in one or more embodiments of the present invention will be described below. The compressor 1 including the configuration described below is manufactured by the manufacturing method described above (FIG. 5), thereby more sufficiently preventing a leak from between the flanges 61, 62 from the rear end of the shell 6 at which the gas pressure is maximum.

(1) The discharge volute 16 (FIG. 1) is formed to wind and expand inward in the axial direction D1, (2) the type of the bolt 70 closest to the impeller 2 on the last stage and the rotating shaft 3A is set to the through bolt 70A, and the seat of the through bolt 70A is located higher than the seats of the other bolts 70.

The seat of the through bolt 70A corresponds to an upper surface of the base 24 at the rear end of the upper half shell 20 and a lower surface of the base 34 at the rear end of the lower half shell 30. The seat of the nut 71 into which the shank of the through bolt 70A is screwed corresponds to the lower surface of the base 34.

The bases 24, 34 can be provided to prevent the through bolt 70A and the member configured to receive the through bolt 70A from interfering with the position of the discharge volute 16 while ensuring a thickness required at the rear end of the shell 6 in terms of strength.

In (1) above, in other words, the position of the discharge volute 16 is shifted inward in the axial direction D1 to reduce the temperature gradient from the outlet 17 to the bearing on the rear end side of the rotating shaft 3A. This can prevent heat deformation of the flanges 61, 62 caused by a sharp temperature difference and prevent a leak.

Also, in (1) above, the discharge volute 16 is retracted inward in the axial direction D1. This allows the through bolt 70A to be provided as close as possible to the last stage and the rotating shaft 3A as in the position of the insertion hole 610X in FIG. 2 while ensuring the thickness required for the shell 6 in (2) above, and avoids an increased length of the rotating shaft 3A. The short rotating shaft 3A can ensure sufficient rigidity of the rotating shaft 3A, and reduce the diameter of the rotating shaft 3A while ensuring the rigidity to reduce the size of the shell 6.

The insertion hole 610X is located near the seal housing holder 51 both in the axial direction D1 and the radial direction D2. Since the insertion hole 610X is close to an edge on an inner peripheral side of the flange 61, the bolt inserted through the insertion hole 610X can ensure surface pressure as far as the edge on the inner peripheral side of the flange 61. This can improve a sealing property by the flanges 61, 62.

In operation of the compressor 1, plastic strain caused by heat stress ratchet deformation is accumulated in the flanges 61, 62 (FIG. 7). The heat stress ratchet deformation means that when a heat stress cycle with plastic deformation is overlappingly applied to a member in which steady stress that does not vary with time is applied, plastic deformation occurs in a certain direction and gradually grows depending on a direction and magnitude of heat stress.

In consideration of such ratchet deformation, the work-hardening step (S2 in FIG. 5) of causing excessive stress in the flanges 61, 62 and plastically deforming the flanges 61, 62 may be repeated a plurality of times (for example, five times). In the work-hardening step, a heat stress cycle is overlappingly applied with steady stress being applied in the flanges 61, 62 in the thickness direction by the axial force of the bolt 70. The plastic deformation due to the ratchet deformation thus caused typically occurs in the thickness direction of the flanges 61, 62.

The work-hardening step is repeated including a stop of the compressor 1, and thus residual strain in the flanges 61, 62 can be sufficiently accumulated as shown in FIG. 7. This can eliminate an influence of the ratchet deformation on the plastic strain, thereby providing a stable axial force in operation after the corrective working step (S3 in FIG. 5) is finished and more stably ensuring the sealing property by the flanges 61, 62.

Besides the above, the configurations included in the embodiments described above may be chosen or changed to other configurations as appropriate without departing from the scope of the present invention.

One or more embodiments of the present invention may be used for manufacturing, besides the shell 6 of the compressor 1, cases of various machines such as a supercharger or a pump, or various structures such as a pressure container or a pipe as long as they include flanges that are fastened together and pressure of a fluid (gas or liquid) therein is applied on the flanges.

From the above, the "fluid apparatus" of one or more embodiments of the present invention encompasses various machines including a shell or a case, containers, and pipes.

The fastening member in one or more embodiments of the present invention includes general fasteners (including rivets) with or without threads, not limited to the bolt.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 centrifugal compressor (fluid apparatus)
2 impeller
3 rotor (compression mechanism)
3A rotating shaft
4 group of diaphragms
5 seal device
6 shell (casing)
11 inlet
12 suction flow path
13 diffuser flow path
14 curved flow path
15 return flow path
16 discharge volute
17 outlet
20 upper half shell (half-split body)
21 housing portion
22 surrounding portion
24 base
30 lower half shell (half-split body)
31 housing portion
32 surrounding portion
34 base
40 diaphragm
40A, 40B member
40R return vane
51 seal housing holder
52 seal member
61, 62 flange
61A seat
61B recess
70 bolt
70A through bolt
70B stud bolt
71, 72 nut
210 peripheral wall
211 front side wall
212 rear side wall
610, 610X insertion hole
612 mating surface
623 convex portion
701 head
A axis
D1 axial direction
D2 radial direction
S1 assembling step (fastening step)
S2 operation step (work-hardening step)
S3 corrective working step
S4 refastening step
S5 shipment step

The invention claimed is:

1. A method of manufacturing a fluid apparatus with flanges that are fastened together, the method comprising:
fastening the flanges with a fastening member;
introducing a fluid into an internal space of the fluid apparatus, and plastically deforming portions of the flanges that form seats for receiving the fastening member and portions of the flanges that form mating surfaces with pressure of the fluid being applied;
releasing the fastening member and correcting at least the mating surfaces out of the seats and the mating surfaces; and
refastening the flanges.

2. The method of manufacturing a fluid apparatus according to claim 1, wherein:
the fluid apparatus is a compressor that compresses the fluid,
a casing that houses the compressor that compresses the fluid includes half-split bodies, and
the flanges included in the half-split bodies are fastened together.

3. The method of manufacturing a fluid apparatus according to claim 2, wherein a discharge volute through which a compressed fluid passes toward and outlet of the compressor expands inward in an axial direction of the casing.

4. The method of manufacturing a fluid apparatus according to claim 1, wherein yield strength of the fastening member is greater than yield strength of the flanges.

5. The method of manufacturing a fluid apparatus according to claim 1, wherein correcting at least the mating surfaces out of the seats and the mating surfaces comprises removing a periphery of a portion depressed by yield and a convex portion protruded by yield in at least the mating surfaces out of the seats and the mating surfaces.

6. The method of manufacturing a fluid apparatus according to claim 1, wherein the introducing of the fluid and the plastically deforming of the portions of the flanges are repeated a plurality of times.

* * * * *